US008032533B1

(12) United States Patent
Spencer et al.

(10) Patent No.: US 8,032,533 B1
(45) Date of Patent: Oct. 4, 2011

(54) SYSTEMS, METHODS, AND SOFTWARE FOR RESEARCHING STATUTORY INFORMATION

(75) Inventors: David Howard Spencer, Woodbury, MN (US); Darla Renae Agard, Eagan, MN (US)

(73) Assignee: Thomson Reuters Global Resources, Baar (CH)

( * ) Notice: Subject to any disclaimer, the term of this patent is extended or adjusted under 35 U.S.C. 154(b) by 0 days.

(21) Appl. No.: 11/334,804

(22) Filed: Jan. 17, 2006

Related U.S. Application Data

(60) Provisional application No. 60/644,465, filed on Jan. 14, 2005.

(51) Int. Cl.
*G06F 7/00* (2006.01)
*G06F 17/30* (2006.01)
*G06Q 50/00* (2006.01)

(52) U.S. Cl. .................... 707/746; 707/942; 705/311

(58) Field of Classification Search .............. 707/3, 4, 707/10, 746, 942, 725; 705/311
See application file for complete search history.

(56) References Cited

U.S. PATENT DOCUMENTS

| | | | |
|---|---|---|---|
| 4,558,413 A | 12/1985 | Schmidt et al. | |
| 4,627,019 A | 12/1986 | Ng | |
| 4,714,992 A | 12/1987 | Gladney et al. | |
| 4,853,843 A | 8/1989 | Ecklund | |
| 4,875,159 A | 10/1989 | Cary et al. | |
| 5,287,496 A | 2/1994 | Chen et al. | |
| 5,440,730 A | 8/1995 | Elmasri et al. | |
| 5,740,425 A | 4/1998 | Povilus | |
| 5,767,854 A | 6/1998 | Anwar | |
| 5,835,087 A | 11/1998 | Herz et al. | |
| 5,892,513 A | 4/1999 | Fay | |
| 5,963,208 A | 10/1999 | Dolan et al. | |
| 6,026,388 A | 2/2000 | Liddy et al. | |
| 6,144,962 A | 11/2000 | Weinberg et al. | |
| 6,233,592 B1 | 5/2001 | Schnelle et al. | |
| 6,470,490 B1 | 10/2002 | Hansen | |
| 6,501,421 B1 * | 12/2002 | Dutta et al. ............. | 342/357.13 |
| 7,216,115 B1 * | 5/2007 | Walters et al. ................... | 707/3 |

(Continued)

FOREIGN PATENT DOCUMENTS

WO   WO-9715890 A1   5/1997

OTHER PUBLICATIONS

Jody Long, Legal Research and the Internet, 2000, Albany N.Y. Delmar Healthcare Publishing, ISBN: 9780766813359, p. 58.*

(Continued)

*Primary Examiner* — James Trujillo
*Assistant Examiner* — Jeffrey Burke
(74) *Attorney, Agent, or Firm* — Hoffmann & Baron, LLP

(57) ABSTRACT

With conventional print and electronic tools, researching statutory material is difficult and time-consuming. So, to facilitate this type of research, the present inventors devised systems, methods, and software that promise to improve the ability of researchers to find, verify, read, and/or interpret statutory information. One exemplary system provides options for users to access statutory information by citation, by table of contents, by index, and/or by popular name; presents specific statutory information in combination with visual indicators, such as red or yellow flags, that indicate the validity or status of the information; and provides requested statutory information in context of links to related information, such as tables of contents, other versions of a statute, case law, scholarly materials, legislative history, cross-referenced statutes, and administrative-law materials.

19 Claims, 6 Drawing Sheets

U.S. PATENT DOCUMENTS

| | | | |
|---|---|---|---|
| 7,293,228 B1 | 11/2007 | Lessing et al. | |
| 7,412,463 B2* | 8/2008 | Mitchell et al. | 707/203 |
| 2002/0023124 A1* | 2/2002 | Murayama | 709/203 |
| 2002/0083090 A1* | 6/2002 | Jeffrey et al. | 707/501.1 |
| 2002/0194014 A1* | 12/2002 | Starnes et al. | 705/1 |
| 2004/0024775 A1* | 2/2004 | Kemp | 707/102 |
| 2005/0278633 A1* | 12/2005 | Kemp | 715/713 |
| 2006/0101027 A1* | 5/2006 | Hotchkiss | 707/100 |
| 2006/0143558 A1* | 6/2006 | Albornoz et al. | 715/512 |
| 2006/0184452 A1* | 8/2006 | Barnes et al. | 705/50 |
| 2009/0043827 A1* | 2/2009 | Mitchell et al. | 707/203 |
| 2009/0177664 A9* | 7/2009 | Hotchkiss et al. | 707/100 |

OTHER PUBLICATIONS

Cornell University Law School Web page, www.law.cornell.edu/uscode/ [online], Feb. 2000 [retrieved on Sep. 26, 2007].*

McClaren, Will, Westlaw Research Guide, West Group, Feb. 2001, Chapter 9, p. 111-134.*

McClaren, Will, Westlaw Research Guide, West Group, Feb. 2001, Chapter 9, p. 111-134.*

Learning Lexis.com, Lexis Publishing, Dayton OH (2000). pp. 1-32.*

Retrieving Statutes in Westlaw.com, West Group, Qucik Reference Guide, published Jan. 1, 2004. pp. 1-4.*

"Information processing—Text and office systems—Standard Generalized Markup Language (SGML)", *ISO 8879:1986*, (1986),166 pages.

"Search Report—EP 954808A4", (2002), 2 p.

Arnold-Moore, T , et al., "Databases of Legislation: the Problems of Consolidations", *Technical Report CITRI TR/94-9, Collaborative Information Technology Research Institute (CITRI)*, (1994),1-22.

Arnold-Moore, T. , et al., "Managing a digital library of legislation", *Proceedings of the ACM International Conference on Digital Libraries 1997.*, ACM, New York, NY, USA.,(1997),175-183.

Arnold-Moore, T. , et al., "The ELF data model and SGQL query language for structured document databases", *Sixth Australasian Database Conference, ADC'95*, 17(2), (1995),17-26.

Azaria, Adrienne , "SGML: A Lifesaver in a Sea of Electronic Documents", *Network World*, 11(50), (Dec. 12, 1994).

Bobrow, D. G., et al., "An augmented state transition network analysis procedure.", *Proc. Internat. Joint Conf. on Artificial Intelligence*, Washington, D.C., (1969),557-567.

Clark, A. , et al., "Technics and praxis: Technological innovation and legal practice in modem society", *Yearbook of Law Computers and Technology*, 4, (1989),16-37.

Corbett, M. , "Indexing and searching statutory text", *Law Library Journal*, 84, (1992),759-67.

Corkern, C. , "I've Got an SGML Database—Why Do I Need HyTime?", http://www.infoloom.com/gcaconfs/WEB/seattle96/cc.htm, (1996),6 p.

Francois, P. , "Generalized SGML repositories: Requirements and modelling", *Computer Standards & Interfaces*, 18(1), (1996),11-24.

Freeman, Simon , "A Brief History of Time Travel", *Legal Information Management*, 4, (2004),28-30.

Greenleaf, G. , et al., "Teaching lawyers information retrieval: the AIRS training system.", *Information Online'88: Australian Online Information Conference*, Sydney., (1988),189-195.

Johnson, P. , et al., "Legislative knowledge base systems for public administration: some practical issues", *Proceedings of the 3rd International Conference on Artificial Intelligence and Law*, (1991),108-117.

Kim, Hyunki , et al., "OOHS: an object-oriented hypermedia system", *Proceedings of 20th International Computer Software and Applications Conference, 1996. COMPSAC '96.*, (1996),496-501.

Merkl, W. , et al., "KELP: a hypertext oriented user-interface for an intelligent legal fulltext information retrieval system", *International Conference on Database and Expert System Applications*, (1990),399-404.

Minsky, M. , "A framework for representing knowledge", *The Psychology of Computer Vision*, Patrick Henry Winston, author; McGraw-Hill Computer Science Series,(1975),211-277.

Moffat, Alistair , "Retrieval of Partial Documents", *Department of Computer Science, The university of Melbourne*, Parkville Victoria, Australia 3052.

Pereira, C. , et al., "Definite clause grammars for language analysis survey of the formalism and a comparison with augmented transition networks", *Artificial Intelligence*, 13(3), (1980),231-278.

Sacks-Davis, Ron , "A Standards-Based Approach to Combining Information Retrieval and Database Functionality", *Collaborative Information Technology Research Institute of RMIT and The University of Melbourne*.

Sacks-Davis, R. , et al., "Database systems for structured documents", *IEICE Transactions on Information and Systems*, E78-D(11), (1995),1335-42.

Sergot, M. J., et al., "The British Nationality Act as a logic program", *Communications of the ACM*, 29(5), (1986),370-386.

Stoyles, R. L., "The unfulfilled promise: Use of computers by and for legislatures.", *Computer/Law Journal*, 9, (1987),73-102.

Tapper, C, , "Computers and legislation", *Alabama Law Review*, 23(1), (1970),1Â?42.

Thorne, J. P., et al., "The syntactic analysis of English by machine", *Machine intelligence*,3, (1969),281-309.

Wilson, E. , "electronic books: the automatic production of hypertext documents from existing printed sources", *Fourth Annual Conference of the UW Centre for the New Oxford English Dictionary: Information in Text*, (1988),29-45.

Wilson, E. , "Integrated information retrieval for law in a hypertext environment", *Proceedings of the 11th Annual International ACM SIGIR Conference on Research and Development in Information Retrieval*, (1988),663-677.

Woods, W. A., et al., "Grammar, augmented transition", *Encyclopedia of Artificial Intelligence*, S. C. Shapiro and D. Eckroth, editors; John Wiley & Sons, Inc., New York,(1987),323-333.

Woods, W. A., "Transition network grammars for natural language analysis", *Communications of the ACM*, 13(10), (1970),591-606.

Arnold-Moore, T., Anderson, P., Sacks-Davis R., "Managing a Digital Library of Legislation," ACM, (1997) ("Arnold-Moore Feb. 1997") [THOM00196741-THOM00196750].

Arnold-Moore, T., "Information Systems for Legislation," (thesis), Department of Computer Science, Royal Melbourne Institute of Technology, Jan. 1998 ("Arnold-Moore Thesis") [THOM00202745-THOM00202984].

Arnold-Moore, T., Clemes, J., Tadd, M. "Connected to the Law: Tasmanian Legislation Using EnAct,", Law via the Internet '99, 1999. [THOM00210045-THOM00210061].

Arnold-Moore, T., "System Architecture: A Developer's View,", Royal Melbourne Institute of Technology, [TASGOVT000481-TASGOVT000504].

Cook, J., Arnold-Moore, T., Paice, S., "Legislation in Its Natural State," SGML Asia-Pacific Conference (Sep. 25, 1996) [THOM00236433-THOM00236441].

CITRI Information, [SAIC001979-1995].

McGhie, L., O'Sullivan, C., "Tasmanian, Western Australian and Queensland Legislation on the Internet," Australian Law Librarian (Jun. 1998) [THOM00209372-THOM00209376].

RMIT, "Connected to the Law: Tasmanian Legislation Using EnAct," [TASGOVT00361-TASGOVT00405].

RMIT, "LSP Detailed Design Document,", Tasmanian State Service, version 2.0, Mar. 18, 1996 [SAIC002489-SAIC002606].

Tadd, M., "A New Way of Looking at the Law: The EnAct Legislation System,", Department of Premier and Cabinet, Tasmania [TASGOVT000527-TASGOVT000566].

Tasmanian State Service, "Legislation System Project: Business Case,", Version 2.0, Nov. 14, 1994 [SAIC002910-SAIC002986].

Tasmanian State Service, "Legislation System Project: System Design Specification," (Dec. 1994) [SAIC002746-SAIC002909].

Tasmanian State Service, "Legislation System Project: Functional Requirements Specification," , version 2.0, Mar. 18, 1996 [SAIC002489-SAIC002745].

Tasmanian State Service, "Legislative System Project Newsletter," (Jun. 1997) [TASGOVT000742-TASGOVT00744].

Tasmanian State Service, "Legislative System Project Newsletter,", No. 5 (Feb. 1998) [TASGOVT006367-TASGOVT006368].

Screen Shots of EnAct, SIM, 1998, RMIT MDSI group, Tasmanian State Gov't. [TASGOVT000524-TASGOVT000526].

Wilkinson, R., etal., "Document Computing: Technologies for Managing Electronic Document Collections,", RMIT University, Melbourne, Australia (1998) [SAIC00110-SAIC00316].

Tasmanian Legislation Online, http://www.thelaw.tas.gov.au (and subpages, including help screens) (also including prior versions found on www.archive.org) [THOM00213430-THOM00213441].

Tasmanian Legislation: Getting Started, http://web.archive.org/web/19981205075517/www.thelaw.tas.gov.au/start.html [THOM00213421].

Tasmanian Legislation_Background, http://web.archive.org/web/19990430002036/www.thelaw.tas.gov.au/background.html [THOM00213424-THOM00213429], published 1999.

ELI 1997 Conference Program ("ELI Program") [THOM00208307-THOM00208323].

Kerr, P., etal., "An Introduction to Legal Resources on the Internet", Crucial Briefs Legal Research Services, (2000) [THOM00208324-THOM00208516].

SCALEplus User Manual (Version 3.0, Jan. 20, 1998) (SCALEplus UM) [THOM00209417-THOM00209434].

AustLII Guide to Legal Research on the Web, http://www.austlii.edu.au/austlii/guide/current/20030315--6.html#Heading1298 [THOM00211924-THOM00211935], published 2003.

SCALEplus User Manual (Version 3.0, Jan. 20, 1998) ("SCALEplus UM 2") [THOM00221673-THOM00221747].

SCALEplus Secrets [AUSAG000191-AUSAG000194].

"Documentum LeafConnect for Interleaf", Documentum 1996 [THOM00196982-THOM00196984].

Interleaf 6 SGML, Interleaf Inc. (1995) [THOM00197307-THOM00197310].

Interleaf 6 Workgroup Tools, Interleaf Inc. (1996) [THOM00197311-THOM00197317].

Interleaf 5 <SGML> User's Guide, Interleaf Inc. (1994) [THOM00203415-THOM00203495].

Interleaf Publisher ("Interleaf Publisher") [THOM00203496-THOM00203497].

"Documentum Workspace", Documentum, Oct. 14, 1996 [THOM00197040-THOM00197042].

"Documentum Announces First Industrial-Strength Product for Web Content Management: Documentum RightSiteTM assembles current and individualized information for diverse user needs,", Documentum (Oct. 14, 1996) [THOM00197037-THOM00197039].

Ovum Evaluation of Documentum, Documentum 3.0, Jan. 1996 [THOM00196990-THOM00197036].

Ovum Evaluation of Interleaf, H2 Interleaf, RDM 2.6, (1996) ("Ovum Interleaf 1996") [THOM00197318-THOM00197351].

De Mets, G., "Consleg Interleaf: SGML Applied in Legislation,", GCA SGML '96, pp. 299-304, (1996) [THOM00196897-THOM00196902].

"Astoria: Information Repository & Management Infrastructure," (Apr. 1997) [THOM00211905-THOM00211912].

"XSoft Premieres Document Component Management System,", Chrystal Software, (Mar. 1996) [THOM00211913-THOM00211915].

"Chrystal Software Recognizes that Organizations Want to Reach Out to the Consumers of Their Document Information," Chrystal Software, 1997 [THOM00211916-THOM00211917].

"Astoria Delivers a Complete Document Management System that Offers Powerful Tools to Search, Edit, Share, and Track Documents and Their Components,", Chrystal Software 1997 [THOM00211918-THOM00211920].

XSoft, A Division of Xerox, Astoria (Jul. 12, 1996), found at http://xml.coverpages.org/duCharme-sgmldbms.html [THOM00198647-THOM00198649].

"XSoft Premieres Astoria; A Simpler Way to Manage 'Mega-Documents'", from PR Newswire (Mar. 12, 1996), found at http://www.highbeam.com/doc/1G1 - 18079234.html [THOM00198650-THOM00198651].

XSoft Astoria, found at http://www.architag.com/tag/Article.asp?v=10&i=4&p=8&s=1 [THOM00198652-THOM00198653].

Law Desk NY Official Reports, 2nd Series, Lawyers Cooperative Publishing (1995) [THOM00213522-THOM00213524].

New York Consolidated Laws Service, Lawyers Cooperative Pub. Co. (1992) [THOM00213530].

Social Security Plus, Version 1.1, Clark Broadman Callaghan (Nov. 1994) [THOM00213521].

RIA OnPoint CD-ROM Tax Library, Research Institute of America (1992) [THOM00213529].

Core Materials on Legal Ethics: An Electronic Publication of the Legal Information Institute Cornell Law School, Cornell University (1995) [THOM00213536].

New Mexico Law on Disk, The Michie Company (1991) [THOM00213527].

Federal Rules of Civil Procedure, Cornell University (1995) [THOM00213532-THOM00213533].

Wilkinson, R., Arnold-Moore, T., Fuller, M., Sacks-Davis, R., Thom, J., Zobel, J., "Document Computing: Technologies for Managing Electronic Document Collections,", Kluwer Academic Publishers, (1998). [THOM00211996-THOM00212107].

Zizi, M., Beaudouin-Lafon, M., "Accessing Hyperdocuments Through Interactive Dynamic Maps," ACM, ECHT '94 Proceedings, Sep. 1994. [THOM00198637-THOM00198646].

Zobel, J., Wilkinson, R., Thom, J., Sacks-David, R., Macki, E., Kent, A., Fuller, M., "An Architecture for Hyperbase Systems", Dept. of Computer Science, RMIT and the Univ. of Melbourne, Technical Report 42, (Jun. 1991). [THOM00206364-THOM00206378].

Wilson, E., "Converting legal texts into expert systems," pp. 1-13 Computing Laboratory, University of Kent at Canterbury.

Wilson, E., Drafting legal documents with Justus' Clerk, pp. 1-14, Computing Laboratory, University of Kent at Canterbury.

Wilson, E., "A Guide to Justus: an overview of a hypertext legal database," BILETA: British and Irish Legal Education Technology Association, pp. 1-13.

Wilson, E., "A Guide to Justus: an overview of a hypertext legal database,", pp. 1-11, Computing Laboratory, University of Kent at Centerbury.

Wilson, E., "The Implications of Hypertext for Law Libraries", University of Kent at Canterbury.

Wilson, E., "Links and structures in hypertext databases for law," pp. 194-211, Computing Laboratory, University of Kent at Centerbury.

Wilson, E., "Mapping Law into Hypertext," pp. 1-47, University of Kent at Centerbury.

Wilson, E., "Mapping Law into Hypertext," pp. 221-240.

Wilson, E., "Mapping Legal documents into hypertext," pp. 1-22, Computing Laboratory, University of Kent at Canterbury.

Wilson, E., "On-Line Electronic Libraries," 9th BiLETA Conference Pre-proceedings, pp. 99-105.

Wilson, E., "Integrated Information Retrieval for Law in a Hypertext Environment," pp. 1-16, Computing Laboratory, University of Kent at Centerbury.

Wilson, E., "Reference and Reference Inversion in Statutes and Cases: A Hypertext Solution," pp. 27-41 (1988) ("Wilson 1988"), University of Kent at Canterbury.

Wilson, E., "Integrated Information Retrieval for Law in a Hypertext Environment," Association for Computing Machinery, pp. 663-677 (1988).

Wilson, E., "Response to Raymond Coulon," International J. for the Semiotics of Law, vol. I, No. 2, pp. 217-220 (1988).

Wilson, E., "Justus: a Workstation for Information Retrieval in Law," pp. 1-12, University of Kent at Canterbury.

Wilson, E., "Electronic Books: the automatic production of hypertext documents from existing printed sources," pp. 1-16, University of Kent at Canterbury.

Wilson, E., "Automatic Text Typing," Computers and the Humanities, 23, pp. 429-442 (1989).

Wilson, E., "A Hypertext Information Retrieval System for Lawyers," Law Technology Centre & Bileta Newsletter, vol. 2, No. 1, pp. 13-19 (Jun. 1989).

Wilson, E., "Justus for Lawyers," Computers and Law, No. 61, pp. 19-20 (Sep. 1989).

Wilson, E., "Reference and Reference Inversion in Statutes and Cases: a Hypertext Solution," in Prospects for intelligent retrieval: Informatics 10, ed. Kevin P. Jones, pp. 27-41 (1990).

Wilson, E., "Cases for Justus: Preparing a Case Database for a Hypertext Information Retrieval System," Computing Laboratory, University of Kent at Canterbury, pp. 1-18 (1990).

Wilson, E., "Cases for Justus: Preparing a Case Database for a Hypertext Information Retrieval System," Literary and Linguistic Computing, vol. 5, No. 2, pp. 119-128 (1990).

Wilson, E., "A Computer Interface for Lawyers," in Human Jobs and Computer Interfaces, eds. Markku I. Nurminen and George R.S. Weir, pp. 53-69 (1991).

Brown, P.J., "Guide User Manual," Computing Laboratory, Twelfth impression, Univ. of Kent, pp. 1-48 (Nov. 1991).

Wilson, E., "Hypertext libraries: the automated production of hypertext documents," pp. 12, University of Kent at Canterbury.

Wilson, E., "Guiding Lawyers: Mapping Law into Hypertext," Artificial Intelligence Review 6,161-89 (1992) ("Wilson 1992").

Wilson, E., "Guiding Lawyers: Mapping Law into Hypertext," pp. 1-24, University of Kent at Canterbury.

Cameron, N., "Technology News," Computers and Law, pp. 23-24 (1992).

Wilson, E., "Reducing the Babel of Lawyers," Information Technology and Legal Education: Towards 2000, BILETA: British & Irish Legal Education Technology Association, pp. 1-14 (Apr. 9, 1992).

Wilson, E., ITAC and SCL Litigation Suppport Second Annual Conference, Mar. 28, 1992, Computers and Law, vol. 3, Issue 2, pp. 33-35 (May 1992).

Wilson, E., "Automating Computer Based Learning Packages for Law Design, Interface and Implementation," pp. 1-13, Computing Laboratory, University of Kent at Canterbury.

Wilson, E., "The Case for SGML: a Law Database, Hypertext and Information Retrieval," International Yearbook of Law Computers and Technology, vol. Seven, pp. 59-75 (1993).

Wilson, E., "Conference Report: The Juggernaut v. The Dinosaurs—The 5th Annual Information Systems for Lawyers," Computers and Law, vol. 4, Issue 91, pp. 17-18, 37-38 (Mar. 1993).

Wilson, E., "Automating Computer Based Learning Packages for Law Design, Interface and Implementation," Law Technology Journal, vol. 2, No. 2, pp. 24-29 (May 1993).

Wilson, E., "Link into Hypertext," VINE91, pp. 3-11 (Jun. 1993).

Wilson, Eve, "Hypertext and Law Librarians," The Law Librarian, vol. 25, No. 1, pp. 30-42 (Mar. 1994).

SGML Asia Pacific'96 Conference: Attendee List, 1996.

Wilson, E. and O'Shea, Philip J., "European law databases: an experiment in retrieval," pp. 1-31 (Mar. 30, 1997).

Wilson, E. and Shepton, Peter D., "SGML as a Vehicle for Porting Hypertext Applications Between Systems," pp. 1-14 (May 31, 1997).

Wilson, E., "A Computer Interface for Lawyers,", University of Kent at Canterbury.

Int'l Standard ISO 8879:1986, "Information Processing-Text and office systems-Standard Generalized Markup Language (SGML)", Technical Corrigendum 2, Ref No. ISO 8879-1986/Cor.2:1999(E).

Uniform Commercial Code, Disk #1, Articles 1,2,3: An Electronic Publication of the Legal Information Institute of Cornell Law School (1995) [THOM00213531].

Law Desk NY Official Reports, 2d Series, Lawyers Cooperative Publishing (1995) [THOM00213528].

Law Desk United States Code Service Titles 1-50, US Constitution, Court Rules, Tables, 4th Quarter 1995, Lawyers Cooperative Publishing (1995) [THOM00213525].

Doggen, Jack, "Formex V3: Tagging the Laws: SGML Used for Complex Multilingual Legal Documents", GCA, SGML'96 Conference Proceedings, (Nov. 18-21, 1996).

Campbell, C. and McGurk, J., "Revising Statutes with Computer Support," 8 Statute Law Review 104 (1987). [THOM00197958-THOM 197968].

Chang, E.E., et al., "The Design and Implementation of a Version Server for Computer-Aided Design Data," Software-Practice and Experience, vol. 19(3), pp. 199-222, (Mar. 1989) John Wiley & Sons, Ltd. [THOM00213658-THOM00231681].

Corbett, M., "Indexing and Searching Statutory Text," 84 Law Library Journal 759-67 (1992). [THOM00197282-THOM00197291].

Cunliffe, D. et al, "Query-Based Navigation in Semantically Indexed Hypermedia", Proceedings of the Eighth ACM Conference on Hypertext HYPERTEXT '97 Publisher: ACM Press (Apr. 1997). [THOM00196903-THOM00196911].

DeRose, S., Maier, E., Orchard, D., XML Linking Language (XLink) Version 1.0, W3C Proposed Recommendation (Dec. 20, 2000). [THOM00198594-THOM00198627].

Dymalski, S., "Interleaf Tips and Tricks," OnWord Press, NM, (1994). [THOM00216029-THOM00216547].

Edelweiss, N., de Oliveira, J.P., Pernici, B., "An Object-Oriented Approach to a Temporal Query Language," 5th International Conference, DEXA 225 (1994). [THOM00213589-THOM00213599].

Elmasri, R. and Wuu, G., "A Temporal Model and Query Language for ER Databases," Proceedings of the Sixth International Conference on Data Engineering 76 (1990). [THOM00213623-THOM00213630].

Elmasri, R., et al., "The Time Index: An Access Structure for Temporal Data," Proceedings of the Very Large Data Bases Conference (VLDC), Brisbane, Australia (1990). [THOM00213577-THOM00213588].

Folio Views Software (See, e.g., Folio Views Infobase Production Kit Utilities Manual, Version 3.1, Provo, Utah: Folio Corporation (Jun. 1, 1994)). [THOM00216548-THOM00216749].

Francois, P., "Generalized SGML Repositories: Requirements and Modeling,", Computer Standards & Interfaces 18 (1996) 11-24, Elsevier. [THOM00198989-THOM00199002].

Fuller, M., Sacks-Davis, R., Wilkinson, R., "Presenting Query Results in a Hyperbase,", Dept. of Computer Science, RMIT, Melbourne, Australia (May 21, 1996). [SAIC000568-SAIC000577].

Goldfarb, C.F., "The SGML Handbook," Oxford University Press, NY (Feb. 28, 1991). [THOM00214673-THOM00215361].

Greenleaf, G. et al., "Public Access to Law via Internet: the Australian Legal Information Institute," 6 Journal of Law (1995). [THOM00196766-THOM00196779].

Guttman, A., "R-Trees: A Dynamic Index Structure for Spatial Searching," Proceedings of the ACM International Conference on the Management of Data (SIGMOD) (1984). [THOM00197192-THOM00197202].

Haake, A., "Under CoVer: The Implementation of a Context Virtual Server for Hypertext Applications," ACM ECHT '94 Proceedings (1994). [THOM00197203-THOM00197215].

Harold, E., "XML: Extensible Markup Language," IDG Books Worldwide, CA (1990). [THOM00198945-THOM00198967].

Hoey, M., "The Discourse Properties of the Criminal Statue," in Computer Power and Legal, Walter (ed.) (1988). [TH0M00196961-THOM00196981].

Goldfarb, Charles F., et al. (Editor), "Information Processing-Hypermedia/Time-based Structuring Language (HyTime)—2d Edition", May 1997 [THOM00213693-THOM00214188].

Kimball, R. and Strehlo, K., "Why Decision Support Fails and How to Fix It," ACM SIGMOD Record, vol. 24, No. 3, (Sep. 1995). [THOM00209119-THOM00209124].

Kimball, R., "Is ER Modeling Hazardous to DSS?", DBMS, (Oct. 1995). [THOM00209125-THOM00209127].

Kolovson, C.P. and Stonebreaker, M., "Indexing Techniques for Historical Databases," Proceedings of the IEEE Data Engineering Conference 127, Memo. No. UCB/ERL M89/34, Apr. 6, 1989, University of California, Berkely, CA [THOM00209323-THOM00209335].

Kolovson, C.P. et al., S-Trees: Database Indexing Techniques for Multi-Dimensional Interval Data, Technical Report UCB/ERL M90/35, Electronics Research Laboratory, College of Engineering, University of California, Berkeley (1990). [THOM00209336-THOM00209693].

Leung, R., "Versioning on Legal Applications Using Hypertext," City Polytechnic of Hong Kong. [THOM00198112-THOM00198115].

Li, C. and Wang, S., "Efficient Storage Structures for Temporal Object-Oriented Databases," 5th International Conference, DEXA 246, Athens, Greece (1994). [THOM00222389-THOM00222412, THOM00213600-THOM00213612].

The ISO 8879 SGML Standard, "Information Technology—Hypermedia/time-based Structuring Language (HyTime)", Ref No. ISO/IEC 10744:1992(E).

Lum, V., et al., "Designing DBMS Support for the Temporal Dimension," ACM SIGMOD Record, vol. 14, Issue 2 (Jun. 1984). [THOM00213361-THOM00213646].

Maioli, C., Sola, S., Vitali, F., "Versioning Issues in a Collaborative Distributed Hypertext System," Technical Report UBLCS-93-6 (Apr. 1993), University of Bologna, Bologna, Italy. [THOM00196502-THOM00196517].

Merrick, F. (Australian Taxation Office) and Robertson, J. (Univ. of Tech.) "Proposal for Participation in the Workshop on Hypertext Systems and Version Support ," Proceedings of the Workshop on Versioning in Hypertext Systems, at ACM European Conference on Hypermedia Technology (ECHT'94). http://web.archive.org/web/19991023013328/cs-pub.bu.edu/students/grads/dgd/workshop/robertson.html [THOM00197078-THOM00197082], 1994.

Rotem, D. and Segev, A., "Physical Organization of Temporal Data," Proceedings of the Third International Conference on Data Engineering, Feb. 3-5, 1987, Los Angeles, CA. [THOM00213682-THOM00213692].

RMIT Multimedia Database Systems, SIM 2.3 Administrator Manual Series. Database Server Reference Manual, (Mar. 2, 1999). [SAIC014543-SAIC014574].

RMIT Multimedia Database Systems, SIM 2.3 Administrator Manual Series. SIM Administration Manual, (Feb. 25, 1999). [SAIC015000-SAIC015039].

RMIT Multimedia Database Systems, SIM 2.3 Administrator Manual Series. Web Server Reference Manual, (Feb. 25, 1999). [SAIC015269-SAIC015292].

RMIT Multimedia Database Systems, SIM 2.3 Programmer Manual Series. Ace Programmer's Guide, (Feb. 25, 1999). [SAIC013718-SAIC013820].

vol. 10: SIM Scripting Language Reference Manual. Ferntree Computer Corporation, Release 1.4 (Nov. 1, 1996). [SAIC009889-SAIC009930].

vol. 15: SIM General Support Library Programmers Manual. Ferntree Computer Corporation, Release 1.4 (Sep. 2, 1996). [SAIC007323-SAIC007332].

vol. 7: SIM PC Interface Tutorial and Reference Manual. Ferntree Computer Corporation, Release 1.4 (Sep. 4, 1996). [SAIC007750-SAIC007805].

vol. 8: SIM PC Interface Administrators Manual. Ferntree Computer Corporation, Release 1.4 (Nov. 1, 1996). [SAIC008570-SAIC008581].

Snodgrass, R. and Ilsoo, A., "A Taxonomy of Time in Databases," Proceedings of the ACM SIGMOD International Conference on Management of Data 236, Dept. of Computer Sciences, NC, Mar. 1985. [THOM00213647-THOM00213657].

Spinellis, D., "The Design and Implementation of a Legal Text Database," 5th International Conference, DEXA 339, SENA S.A., Greece (1994). [THOM00213613-THOM00213622].

Stonebraker, M., "The Design of the Postgres Storage System", Proceedings of the 13th VLDB Conference, Brighton (1987). [THOM00203337-THOM00203348].

The ISO 8879 SGML Standard, Information Processing—Text and office systems—Standard Generalized Markup Language (SGML), Ref No. ISO 8879-1986(E). [THOM00214191-THOM00214356, T].

Travis, B., Waldt, D., "The SGML Implementation Guide: A Blueprint for SGML Migration,", Springer-Verlag, Germany (1995). [THOM00204371-THOM00204649].

Van Herwijnen, E., "Practical SGML, Second Edition,", Kluwer Academic Publishers (1994). ]THOM00214378-THOM00214672].

Wagner, R. and Mansfield, R., "XML All-In-One Desk Reference for Dummies,", Wiley Publishing Co., NY (2003). [THOM00215362-THOM00216028].

Whitehead, E. James, "Versioning in Hypertext Systems,", Dept. of Information and Computer Science, Univ. of California, Irvine, CA, Dec. 7, 1999 [THOM00208156-THOM00208197].

Agosti, M., Colotti, R., Gradenigo, G., "A Two-Level Hypertext Retrieval Model for Legal Data,", ACM, (1991) [THOM00196683-THOM00196692].

Arnold-Moore, T. & Sacks-Davis, R., "Databases of Legislation: The Problems of Consolidation," Collaborative Information Technology Research Institute, TR-94-9, Jul. 4, 1994 [THOM00206435-THOM00464].

Arnold-Moore, T., Fuller, M., Lowe, B., Thom, J., Wilkinson, R., "The ELF Data Model and SGQL Query Language for Structured Document Database," (1994) [THOM00196608-THOM00196617].

Arnold-Moore, T., "Automatically Processing Amendments to Legislation," 1995 ACM 0-89791-758-8/95/000510297 [THOM00196751-THOM00196760].

Arnold-Moore, T., "Automatic Generation of Amendment Legislation," ICAIL-97, Melbourne, Australia, 1997 ACM 0-89791-924-6/97/96 [THOM00196521-THOM00196527].

Arnold-Moore, T., Anderson, P., Sacks-Davis R., "Managing a Digital Library of Legislation," DL-97, Philadelphia, PA (1997) [TH0M00196741-THOM00196750].

Azaria, A., Network World, "SGML: a Lifesaver in a Sea Electronic Documents," LookSmart, (Dec. 12, 1994) [THOM00196790-THOM00196791].

Bachman, C., "The Programmer as Navigator," Association for Computing Machinery, Inc., Nov. 1973, vol. 16, No. 11, [THOM00204044-THOM00204049].

Bentley, J., Friedman, J., "Data Structures for Range Searching," Computing Surveys, vol. 11, No. 4, Dec. 1979 [THOM00204343-THOM00204355].

Campbell, B., Goodman, J., "HAM: A General Purpose Hypertext Abstract Machine," ACM Jul. 1988,vol. 31, No. 7 [THOM00196867-THOM00196872].

Caplinger, M., "Graphical Database Browsing," ACM (1986) [THOM00208979-THOM00208987].

Haake, A., "CoVer: A Contextual Version Server for Hypertext Applications," Proceedings of the ACM ECHT Conference, Nov. 30-Dec. 4, 1992 [THOM00195956-THOM00195965].

Horne, Roger, "The Statute Law Database," (1997) [THOM00195994-THOM00195997].

Kim, H., Shin, H., Chang, J., "OOHS: An Object-Oriented Hypermedia System," Proceedings of the COMPSAC '96, 0730-3157/96 [THOM00196548-THOM00196553].

Kimball, R., "The Data Warehouse Toolkit: Practical Techniques for Building Dimensional Data Warehouses," John Wiley 1996 [THOM00211947-THOM00211995].

Lo, C., "Integrating Links and Versioning in Document Management,", Australian Computer Science Communications, vol. 17, No. 1(1995) [THOM00207652-THOM00207661].

Lo, C., "Link and Versioning Management in an SGML Based Document Management System,", Department of Computer Science, Royal Melbourne Institute of Technology, Melbourne, Australia (1996) [THOM00202985-THOM00203208].

Noik, E., "Exploring Large Hyperdocuments: Fisheye Views of Nested Networks,", ACM, Hypertext '93 Proceedings (1993) [THOM00197536-THOM00197549].

Osterbye, K., "Structural and Cognitive Problems in Providing Version Control for Hypertext,", ACM, Milano, Nov. 30-Dec. 4, 1992 [THOM00197603-THOM00197612].

Promenschenkel, G., "STEPS toward a new era in electronic publishing," OCLC Newsletter No. 216, published by OCLC, Jul./Aug. 1995 [THOM00196578-THOM00196580].

Sacks-Davis, R., Arnold-Moore, T., Zobel, J., "Database Systems for Structured Documents," Int'l. Symposium on Advanced Databse Technologies and Their Integration, Japan, Oct. 1994 [THOM00198835-THOM00198846].

Sacks-Davis, R., Kent, A., Ramamohanarao, K., Thom, J., Zobel, J., "Atlas: A Nested Relational Database System for Text Applications," IEEE Transactions on Knowledge and Data Engineering, vol. 7, No. 3 Jun. 1995 [THOM00197969-THOM00197985].

Sciore, E., "Multidimensional Versioning for Object-Oriented Databases," Lecture Notes in Computer Science, Deductive and Object-Oriented Databases, Second Int'l. Conference, DOOD '91, Munich Germany (1991) [THOM00209291-THOM00209307].

Sciore, E., "Versioning and Configuration Management in an Object-Oriented Data Model," VLDB Journal 3, 77-106 (1994) [THOM00206121-THOM00206150].

Stonebraker, M., Rowe, L., Hirohama, M., "The Implementation of Postgres," IEEE Transactions on Knowledge and Data Engineering, vol. 2, No. 1, Mar. 1990 [THOM00203349-THOM00203366].

Stonebraker, M., Chen, J., Nathan, N., Paxson, C., Wu, J., "Tioga: Providing Data Management Support for Scientific Visualization Applications,", Computer Science Division, Univ. of CA, Berkeley, CA, 1994 IEEE Symposium on Visual Languages (1994) [THOM00209213-THOM00209226].

Taylor, C., Tudhope, D., Beynon-Davies, P., "Technical Briefing Representation and Manipulation of Conceptual Temporal and Geographical Knowledge in a Museum Hypermedia System," ECHT '94 Proceedings, Sep. 1994 [THOM00198022-THOM00198027].

Travis, B., Waldt, D., "The SGML Implementation Guide: A Blueprint for SGML Migration," Springer-Verlag, Germany (1995) [THOM00204371-THOM00204649].

Wilkinson, R., Arnold-Moore, T., Fuller, M., Sacks-David, R., Thom, J., Zobel, J., "Document Computing: Technologies for Managing Electronic Document Collections,", RMIT University, Melbourne, Australia (1998) [SAIC00110-SAIC00316].

The Premise software ("Premise Software") [THOM00194621].

Kinney, Diane, "Reengineering SGML Implementation: Second Generation SGML Systems", GCA SGML '96 Conference Proceedings (Nov. 18-21, 1996) [THOM00197938-THOM00197940].

Li, C. and Wang, S., "Efficient Storage Structures for Temporal Object-Oriented Databases,", Dept. of Computer Science and Information Engineering, National Chiao Tung Univ., Hsinchu, Taiwan, Republic of China. [ THOM00213600-THOM00213612].

Larson, R., "Hypertext and Information Retrieval: Towards the Next Generation of Information Systems," Proceedings of the 51st ASIS Annual Meeting, Georgia, vol. 25 (1988) [THOM00221655-THOM00221660].

Peltonen, H, Mannisto, T., Alho, K., Sulonen, R., "An Engineering Document Management System," ASME Winter Annual Meeting, Louisiana, Nov. 28-Dec. 3, 1993 [THOM00221637-THOM00221654].

Cygnet, Mark, "Discovering Westlaw: The Essential Guide" West Publishing Corp., 1996 [THOM00221940-THOM00222172].

A sample Premise dataset: Annotated California Codes from 199X ("Premise Statutes") [THOM00194622-23].

Premise Publisher for Windows, User Manual ("Premise Publisher") [THOM00210191-THOM00210579].

Witzel, "Premise Research Software for Windows, User's Guide", West Publishing Corp., MN, 1996 [THOM00210580-THOM00210844].

Int'l Standard ISO 8879:1986, "Information Processing—Text and office systems—Standard Generalized Markup Language (SGML)", Technical Corrigendum 1, Ref No. ISO 8879-1986/Cor.1:1996(E).

"Westlaw DataBasics" (1993) ("DataBasics 1993") [THOM00211156-THOM00211869].

Teply, L., "Legal Research and Citation," West Publishing Company, MN (1992) [THOM00211117-THOM00211155].

Johnson, N., Berring, R., Woxland, T., "Winning Research Skills,", West Publishing Co., MN, (1991) [THOM00211088-THOM00211116].

"Password: Power Research," Westlaw, vol. 11, No. 5 (May 1991) [THOM00211072-THOM00211087].

Johnson-Maloney, Nancy, "Westlaw Reference Manual" West Publishing Corp., MN (1993) [THOM00210996-THOM00211071].

Wren, C., Wren, J., "Using Computers in Legal Research: A Guide to Lexis and Westlaw," Adams & Ambrose, Wisconsin, (1994) [THOM00210845-THOM00210954].

Dozier, C., Morton, J., "Introduction to Westlaw Database File Organization," (1991) [THOM00211870-THOM00211904].

AMPEX markup file for California Statute CA Bus & Prof Code § 2 (1996) [THOM00209405-THOM00209407].

Roban, Roberta, I., "Discovering Westlaw: The Essential Guide", West Publishing Co., (1992) [THOM00210955-THOM00210995].

McKennell, "WESTMATE 5.1 for Windows, User Manual," West Publishing Corp., MN (1993) [THOM00221863-THOM00221939].

Int'l Standard ISO 8879 "Information Processing—Text and office systems—Standard Generalized Markup Language (SGML)", Ref No. ISO 8879-1986(E). [THOM00329111-THOM00329315].

\* cited by examiner

FIGURE 4

Fig. 20: Document Center – Administrative References

Fig. 21: Document Center – Analytical References

FIGURE 6

SYSTEMS, METHODS, AND SOFTWARE FOR RESEARCHING STATUTORY INFORMATION

RELATED APPLICATION

This application claims priority to U.S. Provisional Application 60/644,465, which was filed on Jan. 14, 2005 and which is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2005, Thomson Global Resources.

TECHNICAL FIELD

The present invention concerns systems, methods, and software for online researching of legal statutes and related information.

BACKGROUND

The American legal system relies heavily on written laws and judicial opinions. Because of this, judges and lawyers within our legal system are continually researching an ever-changing body of statutes and past opinions (case law) to make decisions and advise their clients.

To facilitate these searches, companies, such as West Publishing Company of St. Paul, Minn. (doing business as Thomson West), collect and publish statutes and judicial opinions from across the United States in both print and electronic form. The electronic form of the statutes and case law are electronically searchable via the Internet through the www-.Westlaw.com legal research website.

Although services, such as Westlaw.com, have provided enormous benefits to the legal industry, the present inventors have recognized considerable room for improvement, particularly in the area of statutes research. This aspect of legal research is notoriously difficult and time-consuming. Even with electronic search capabilities, many researchers prefer using print materials.

Accordingly, the present inventors have recognized a need for tools that facilitate researching statutory information.

SUMMARY

To address this and/or other needs, the present inventors devised systems, methods, and software that promise to improve the ability of researchers to find, verify, read, and/or interpret statutory information. One exemplary system provides a number of graphical user interfaces that facilitate researching statutory information. For finding statutory information, one exemplary interface provides options for users to access statutory information by citation, by table of contents, by index, and/or by popular name. For verification, a results interface presents specific statutory information in combination with visual indicators, such as red or yellow flags, that indicate the validity or status of the information. For reading ease, requested statutory information is presented in one pane of an interface and an adjacent pane provides a list of links to related information, such as tables of contents, other versions of a statute, case law, scholarly materials, legislative history, cross-referenced statutes, and administrative-law materials. The list of links also functions as a checklist for statutory research. And for interpreting the statutory information, the list of links includes lists to cases that cite the statute, for example, a list of citing cases decided within the last 60 days of a given access.

BRIEF DESCRIPTION OF DRAWINGS

FIG. 4 is a facsimile of a graphical user interface 400 which corresponds to one or more embodiments of the invention.

FIG. 6 is a facsimile of an exemplary graphical user interface 600 which corresponds to one or more embodiments of the invention.

DETAILED DESCRIPTION OF EXEMPLARY EMBODIMENTS

This description, which references and incorporates the above-identified Figures, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
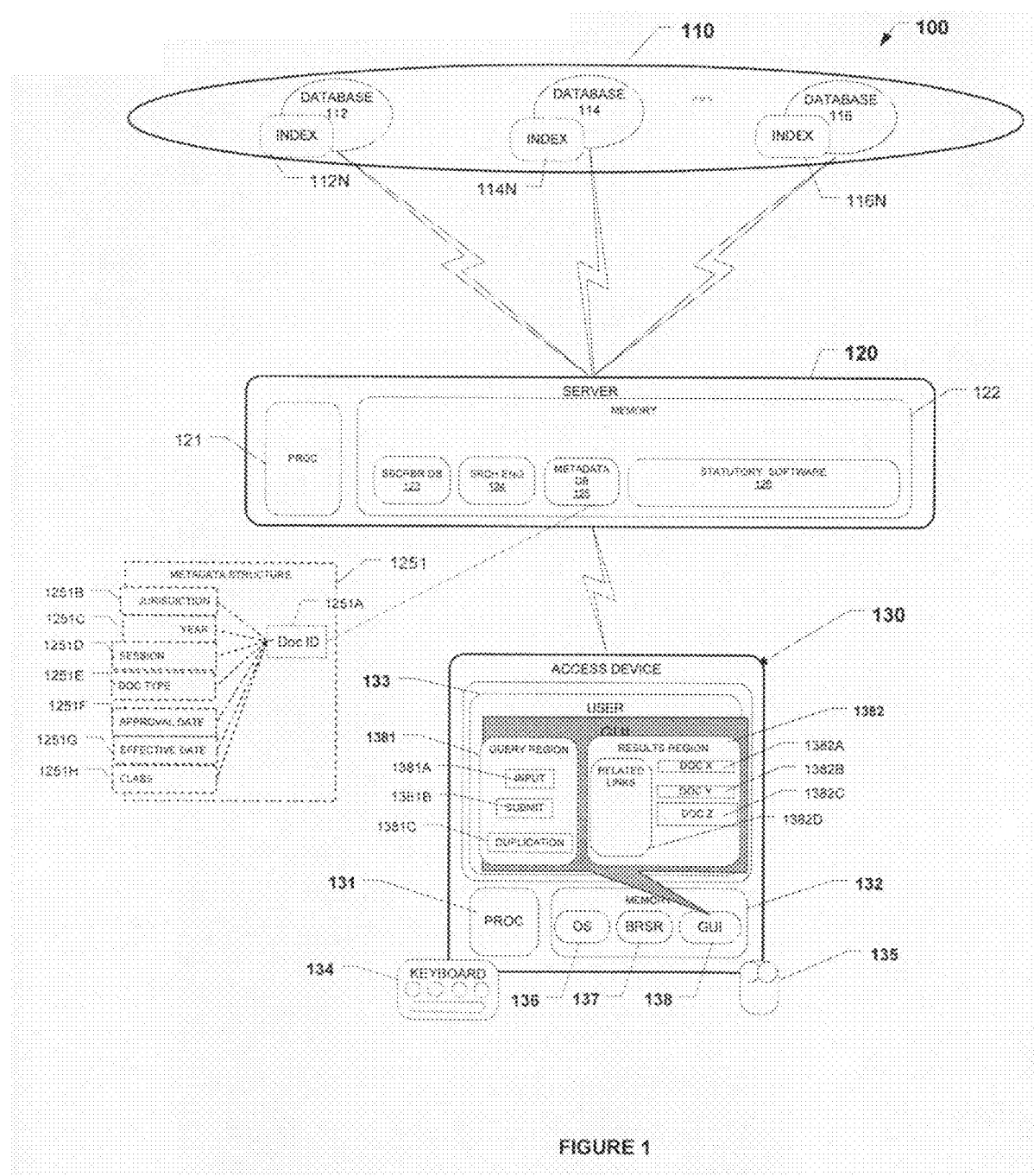
FIG. 1 is a diagram of an exemplary legal research system 100 corresponding to one or more embodiments of the invention.

FIG. 1 shows an exemplary online information-retrieval system 100, which incorporates teachings of the present invention. System 100 includes one or more databases 110, one or more servers 120, and one or more access devices 130.

Databases 110 include a set of non-statutory legal documents 112, a set of statutory legal documents 114, and other legal documents 116. Documents 112, in the exemplary embodiment, include case law documents from federal, state, and/or local jurisdictions. Statutory legal documents 114 include federal, state, and/or local statutes and administrative rules as well as legislative history. Other legal documents 116 include legal articles, encyclopedias, and so forth. (Databases 110 may also include other content as implied below or in the referenced provisional application.)

Databases 110 (112, 114, 116), which take the exemplary form of one or more electronic, magnetic, or optical data-storage devices, include or are otherwise associated with respective indices (112N, 114N, 116N). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a search module 124, a metadata database 125 and a legal research module (or software) 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, search engines 124, metadata database 125 and legal research module 126.

Subscriber database 123 includes subscriber-related data for controlling, administering, and managing pay-as-you-go or subscription-based access of databases 110. In the exemplary embodiment, database 123 includes user identifiers, access credentials, and billing or pricing information.

Search module 124 includes one or more search engines and related user-interface components, for receiving and processing queries against one or more of databases 110, with use of indices 114N. In the exemplary embodiment, one or more search engines associated with search module 124 provide Boolean, tf-idf (term frequency-inverse document frequency), and/or natural-language search capabilities.

Metadata database 125 includes a number of data structures, such as data structure 1251, to facilitate fulfillment of queries, particularly those related to statutes or versions thereof. In the exemplary embodiment, data structure 1251 includes a document identifier 1251A, which is logically associated with a jurisdiction indicator 1251B, a year indicator 1251C, a session indicator 1251D, a document type 1251E, an approval date 1251F, an effective date 1251G, and a class indicator 1251H.

Statutory research software 126 comprises machine readable and/or executable instructions for wholly or partly defining web-based user interfaces (such as a user interface 138 and those shown in subsequent figures) over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131, a memory 132, a display 133, a keyboard 134, and a graphical pointer or selector 135 (also known as a mouse).

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A, a query submission button 1381B. Query input region 1381A also allows a user to input text or provide other input for defining or selecting a query. Query submission button 1381B allows user to initiate submission or communication of the query to server 120. Search-results region 1382 is also defined in memory and upon rendering includes one or more interactive control features 1382A-1382D. Control features 1382A-1382C correspond to one or more statutory documents enable a user to selectively access or retrieve one or more corresponding documents relevant to the governing query from databases 110 via server 120. Each of control features 1382A-1382C includes a respective document identifier or label, such as DOCX, DOCY, or DOCZ, identifying respective titles or other aspects of the associated documents. Control feature 1382D, which in the exemplary embodiment is representative of one or more control features, enables a user to selectively invoke display of other materials related to the one or more of the statutory documents associated with control features 1382A-1382C.

In the exemplary embodiment, each of these control features of interface 138 takes the form of a hyperlink or other browser-compatible command input. Although FIG. 1 shows query region 1381 and results region 1382 as being simultaneously displayed, some embodiments present them at separate times.

Exemplary Method(s) of Operation

Figure 2:
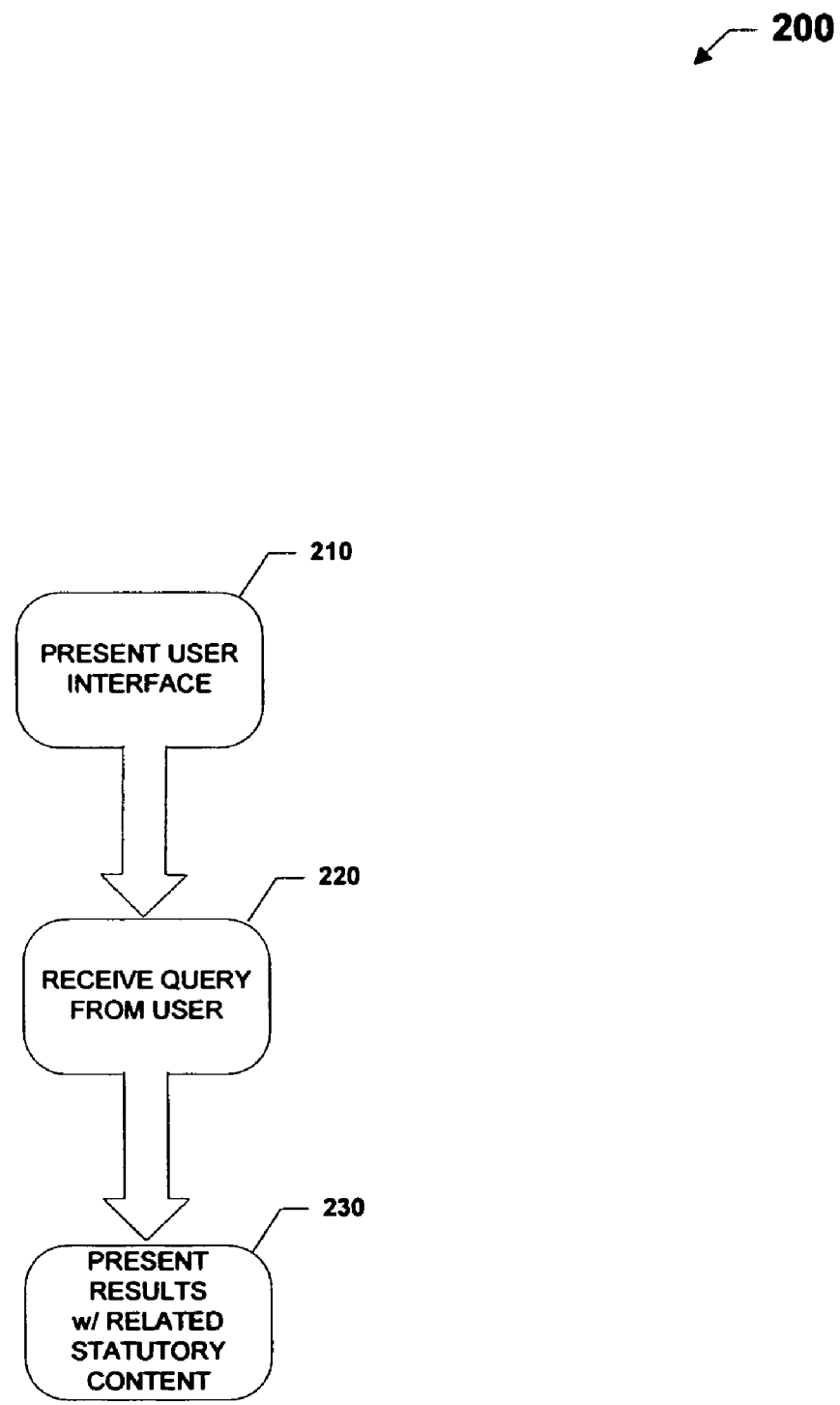
FIG. 2 is a flowchart of an exemplary method associated with system 100 of FIG. 1 and corresponding to one or more embodiments of the invention.

FIG. 2 shows a flow chart 200 illustrating in greater detail an exemplary method of operating system 100. Flow chart 200 includes a number of process blocks 210, 220, and 230. Though arranged serially in the exemplary embodiment, other embodiments may reorder the blocks, omits one or more blocks, and/or execute two or more blocks in parallel using multiple processors or a single processor organized as two or more virtual machines or subprocessors. Moreover, still other embodiments implement the blocks as one or more specific interconnected hardware or integrated-circuit modules with related control and data signals communicated between and through the modules. Thus, the exemplary process flow is applicable to software, firmware, hardware, and hybrid implementations.

At block 210, the exemplary method begins with presentation of a user interface tailored for statutory research. In the exemplary embodiment, this entails a user directing a browser in a client access device, such as device 130 in FIG. 1, to an internet-protocol (IP) address for an online information-retrieval system, such as system 100, and then logging onto the system using appropriate credentials. Successful login results in a web-based search interface, such as interface 138 in FIG. 1 (or one or more portions thereof) being output from server 120, stored in memory 132, and displayed by client access device 130. Execution then continues at block 220.

Figure 3:
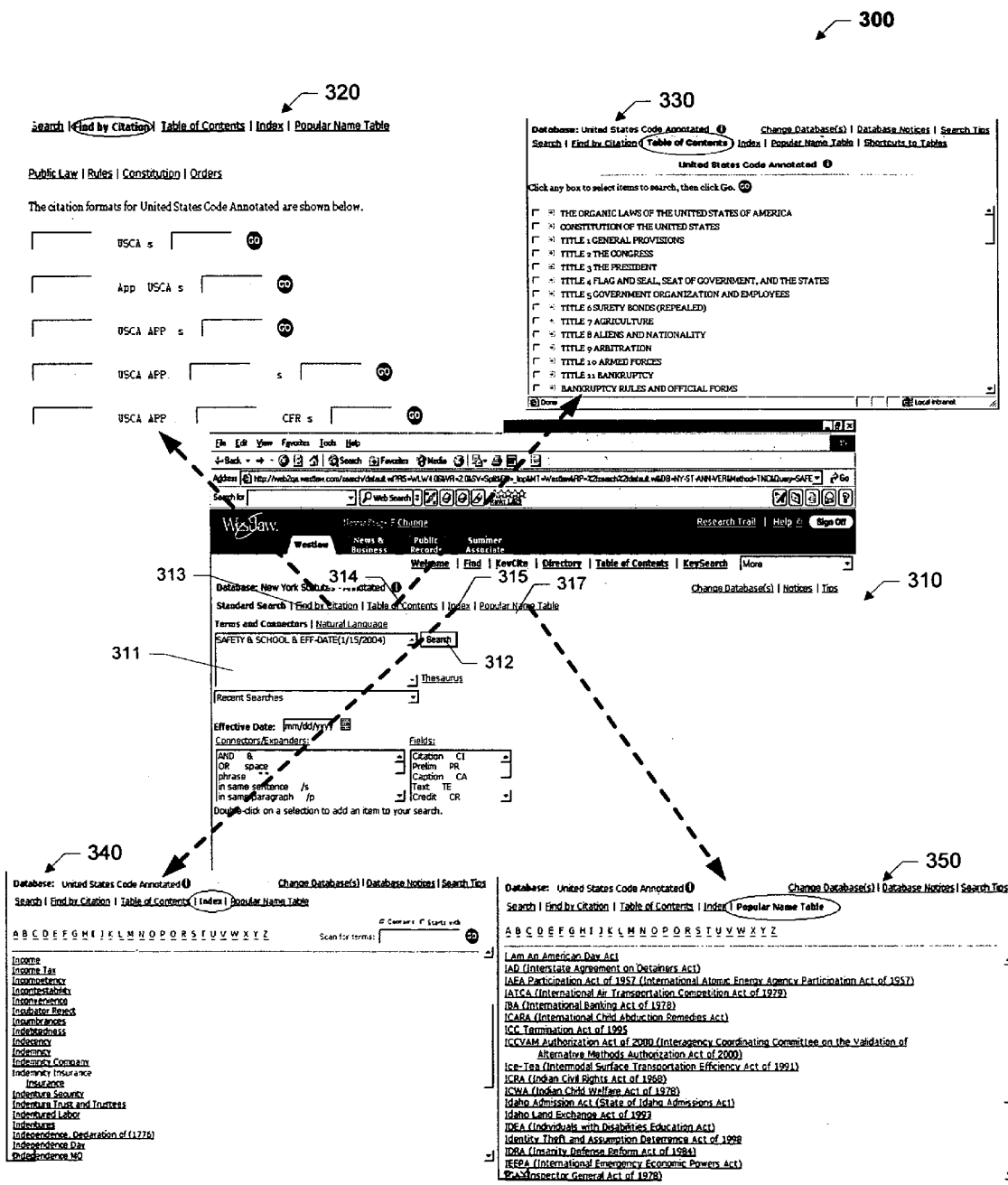
FIG. 3 is a facsimile of an exemplary graphical user interface 300 which corresponds to one or more embodiments of the invention.

Block 220 entails receiving a query from the user. In the exemplary embodiment, the user defines the query by interacting with the interface, specifically entering terms of the query into a query input region and finally actuating a query submission feature to transmit the query to a server, such as server 120 for processing. In some embodiments, the user query takes the form of a popular name of a statute, that is, a statute alias, which can be used to assist in identification of the corresponding statute or portion thereof. In others, it takes the form of a citation for a statute, or a request for a table of contents. FIG. 3 shows an exemplary query or search interface 300 that may be substituted for or added to region 1381. Interface 300 includes interface displays 310, 320, 330, 340 and 350. Interface display 310 includes a query input region 311, a search command input 312, find-by-citation feature 313, table-of-contents feature 314, index feature 315, and a popular name feature 317. User selection of features 313, 314, 315, and 317 invokes display of respective interface displays 320, 330, 340, and 350. Execution then advances to block 230 (as shown in FIG. 2).

Block 230 entails presenting a graphical user interface listing the identified set of documents. In the exemplary embodiment, this entails displaying a listing of the identified set of one or more statutes on interface 138, specifically within or as part of search-results region 1382, along with related statutory content, such as one or more indicators regarding the status of the statutes.

Figure 4:
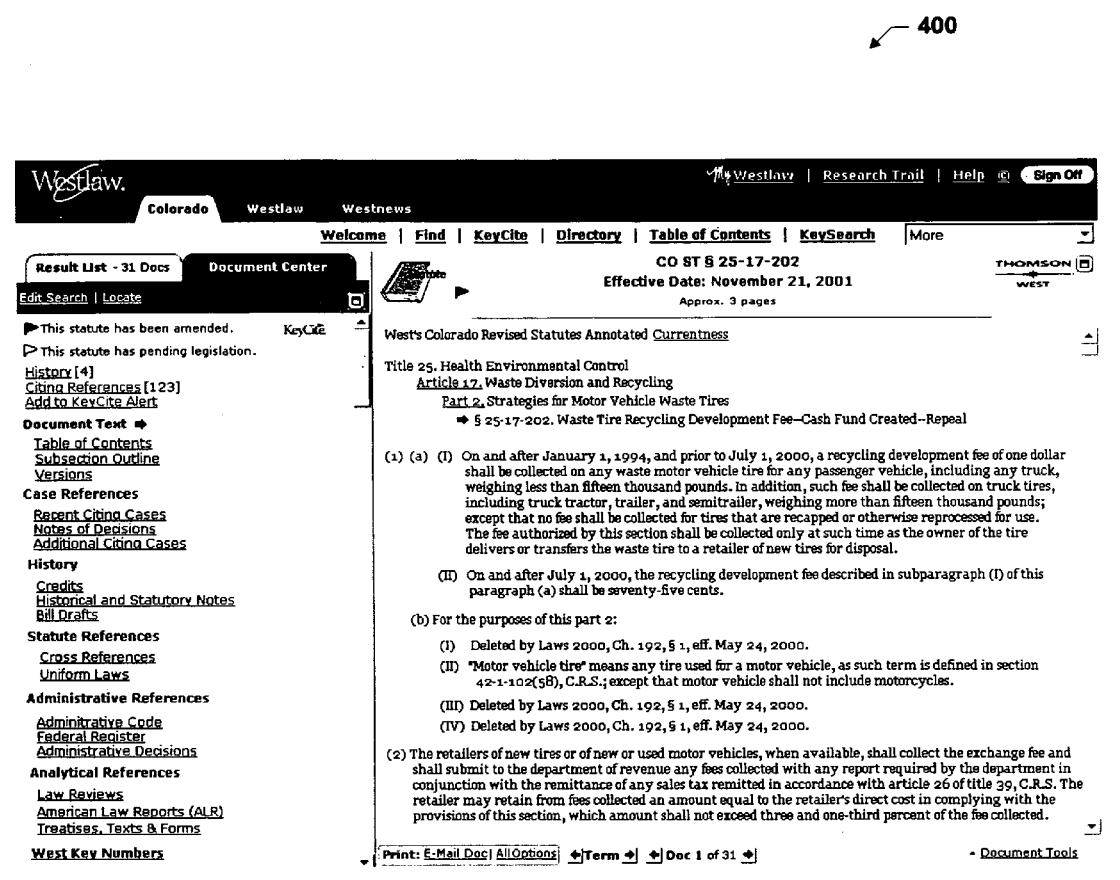
Figure 5:
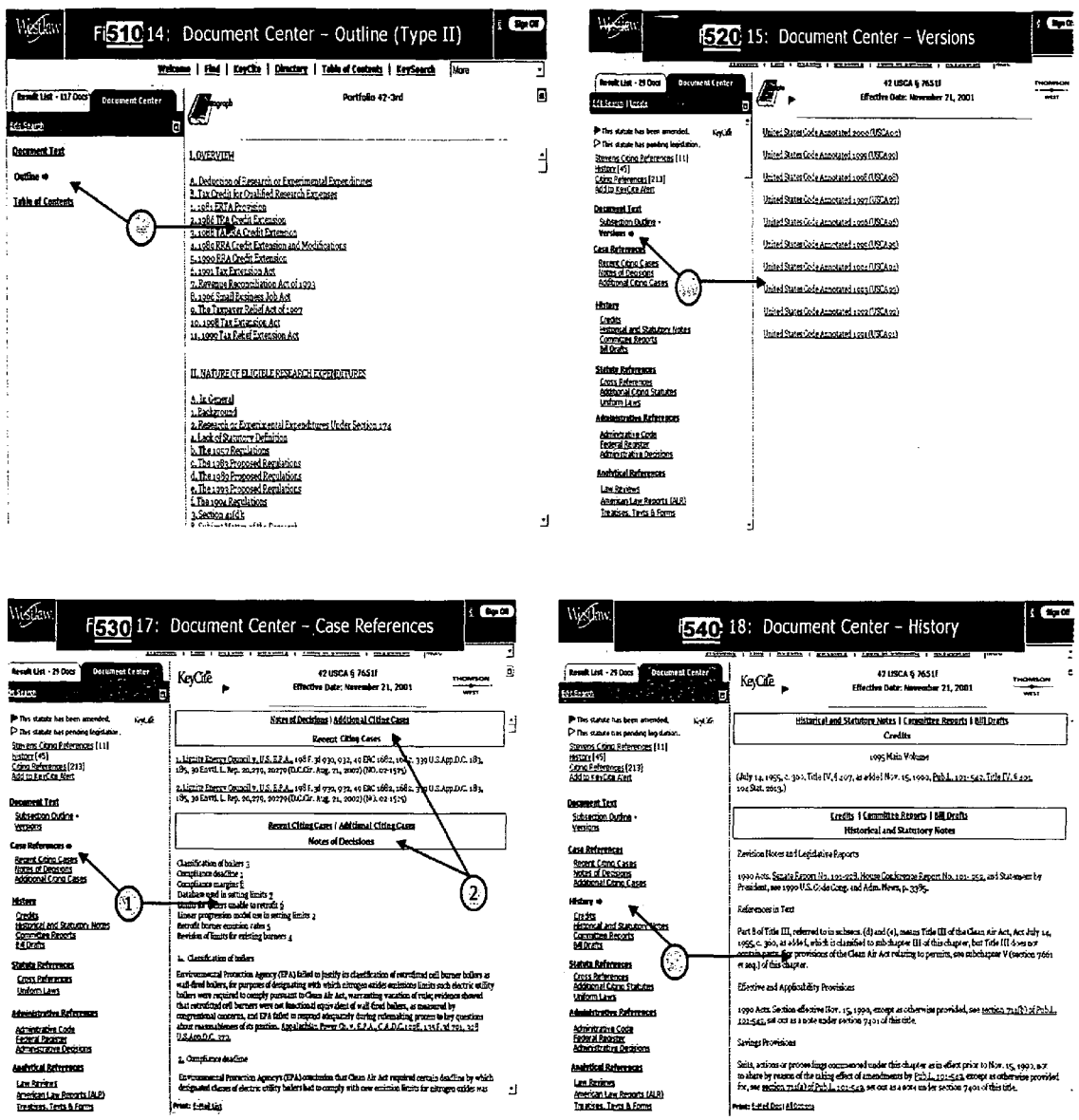
FIG. 5 is a facsimile of an exemplary graphical user interface 500 which corresponds to one or more embodiments of the invention.
Figures 6, 20, 21:
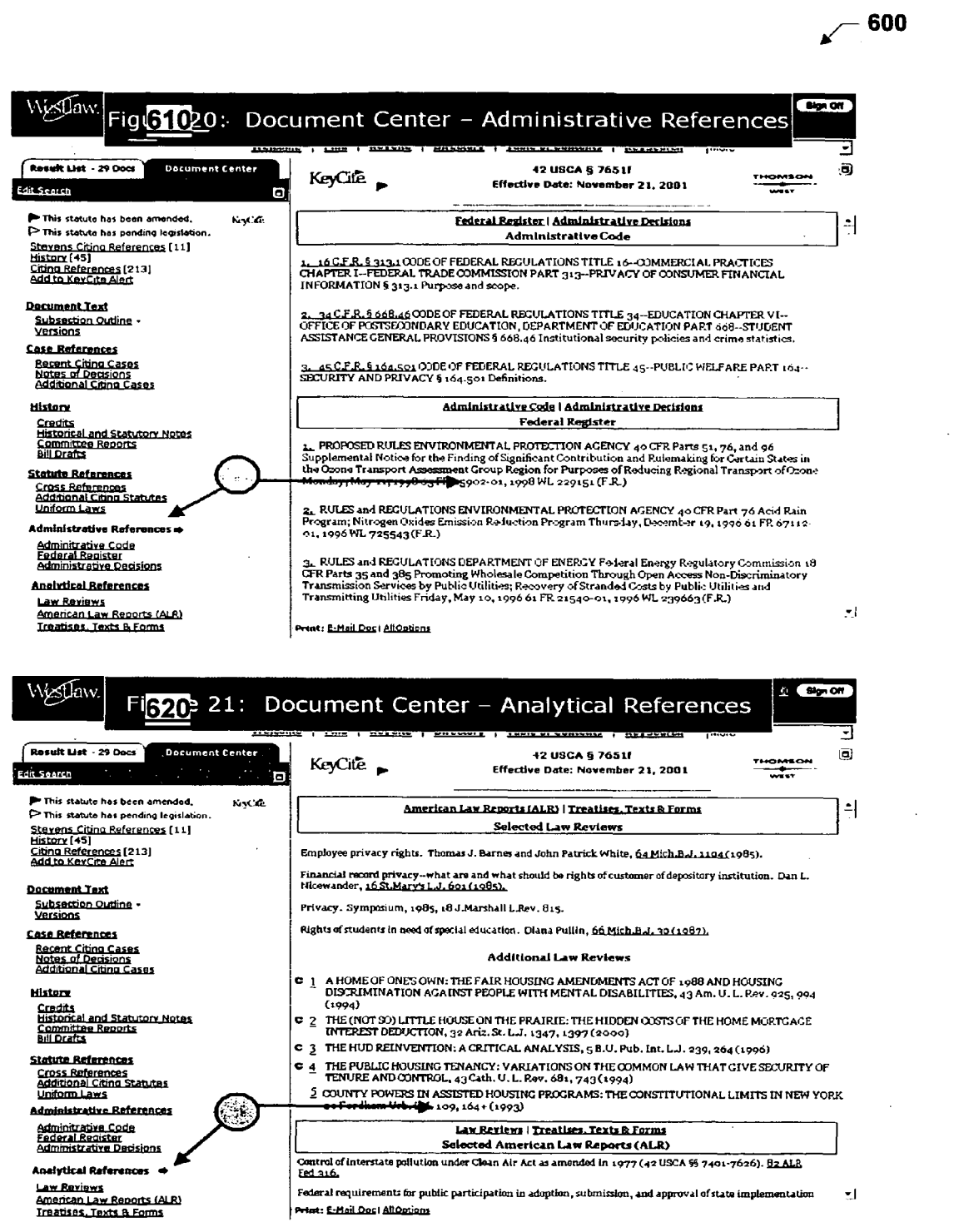

FIGS. 4-6 shows an exemplary search results interface 400-600, which may be substituted for or added to search results region 1382.

CONCLUSION

In furtherance of the art, the inventors have presented, among other things, various exemplary systems, methods, and software which facilitate online research of statutory materials.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. An information-retrieval system, the system comprising:
a plurality of databases, including statutory content and non-statutory content; and
one or more servers to facilitate client access to the plurality of databases over a network, at least one of the servers configured to provide a client access device with a graphical user interface to query statutory content via a table of contents and an effective date of the statutory content; and
wherein the graphical user interface includes a display region configured to display the table of contents of a selected legal statute database as a plurality of search-selectable legal statute categories, a query input field configured to receive at least one search criterion and a date input field configured to receive the effective date, each search-selectable legal statute category associated with one or more legal statutes, and
wherein the one or more of the servers is configured in response to receipt of the effective date to dynamically define and display a historical table of contents of the selected legal statute database in the display region based on the received effective date, the historical table of contents including a plurality of search-selectable legal statute categories each associated with one or more legal statutes, at least one of the search-selectable legal statute categories being user-selectable to query the one or more legal statutes associated with the at least one of the search-selectable legal statute categories in the selected legal statute database.

2. The system of claim 1, wherein the date input field is associated with a textual label indicating that the field is for an effective date.

3. The system of claim 1, wherein the table of contents or the historical table of contents includes a link to the one of the legal statutes.

4. The system of claim 1, wherein at least one of the servers includes a plurality of data structures to facilitate fulfillment of queries, each of the data structures including a document identifier for a statutory document of the statutory content, the identifier associated with an effective date indicator, an approval date indicator, and a jurisdiction indicator.

5. The system of claim 4, wherein the identifier of the document is logically associated with the effective date indicator, the approval date indicator, and the jurisdiction indicator.

6. The system of claim 4, wherein the identifier of the document is further associated with a year indicator, a session indicator, a document type indicator, and a class indicator.

7. The system of claim 1, wherein the at least one server includes graphical interface means for retrieving the statutory content via the table of contents.

8. The system of claim 1, wherein the at least one server includes:
graphical interface means for querying the statutory content via the table of contents; and
means for providing the statutory content in response to a query via the graphical interface means for querying, wherein the provided statutory content is in combination with icons that visually indicate validity or status of one or more portions of the provided statutory content.

9. The system of claim 1, wherein the at least one server includes:
graphical interface means for querying the statutory content via the table of contents; and
means for providing the statutory content in response to a query via the graphical interface means for querying, wherein the provided statutory content is in combination with a list of links to related information in the non-statutory content, with the related information including case law information or legislative history information.

10. The system of claim 1, wherein the at least one server includes:
means for providing the statutory content in response to a query for statutory content, wherein the provided statutory content is in combination with a list of links to related non-statutory information, the related non-statutory information including case law information, legislative history information, or scholarly research information.

11. The system of claim 1, wherein the at least one server is further configured in response to a query for the statutory content to present within the interface a link to a statutory document based on the query and at least one link to a prior version of the statutory document.

12. The system of claim 1, wherein the server is further configured in response to a query for the statutory content to present within the interface a link to a statutory document based on the query and a future version of the statutory document.

13. The system of claim 1, wherein the one or more of the servers is further configured in response to receipt of at least one selected legal statute category from the historical table of contents and the at least one search criterion to query the statutory content based on the received at least one selected legal statute category, the at least one search criterion and the effective date.

14. A system to retrieve information, the system comprising:
   a plurality of legal statute databases; and
   a server coupled to the legal statute databases, the server configured to:
      receive from a client an effective date associated with a selected legal statute database; and
      dynamically define and transmit to the client a historical table of contents of the selected legal statute database based on the received effective date as a plurality of search-selectable legal statute categories each associated with one or more legal statutes, at least one of the search-selectable legal statute categories being user-selectable to query the one or more legal statutes associated with the at least one of the search-selectable legal statute categories in the selected legal statute database.

15. The system of claim 14, wherein the server is further configured to:
   receive from the client a selection of at least one search-selectable legal statute category and a search criterion;
   retrieve at least one legal statute from the selected legal statute database based on the at least one selected legal statute category, the search criterion and the effective date; and
   transmit to the client the retrieved at least one legal statute.

16. A method of retrieving information, the method comprising:
   receiving from a client by a server an effective date associated with a selected legal statute database; and
   dynamically defining and transmitting by the server to the client a historical table of contents of the selected legal statute database based on the received effective date as a plurality of search-selectable legal statute categories each associated with one or more legal statutes, at least one of the search-selectable legal statute categories being user-selectable to query the one or more legal statutes associated with the at least one of the search-selectable legal statute categories in the selected legal statute database.

17. The method of claim 16, further comprising:
   receiving from the client by the server a selection of at least one search-selectable legal statute category and a search criterion;
   retrieving by the server at least one legal statute from the selected legal statute database based on the at least one selected legal statute category, the search criterion and the effective date; and
   transmitting by the server to the client the retrieved at least one legal statute.

18. A computer-readable storage medium comprising operational instructions that, when executed by a processor, cause the processor to:
   receive an effective date from a client associated with a selected legal statute database; and
   dynamically define and transmit to the client a historical table of contents of the selected legal statute database based on the received effective date as a plurality of search-selectable legal statute categories each associated with one or more legal statutes, at least one of the search-selectable legal statute categories being user-selectable to query the one or more legal statutes associated with the at least one of the search-selectable legal statute categories in the selected legal statute database.

19. The computer-readable storage medium claim 18, further comprising operational instructions that, when executed by the processor, cause the processor to:
   receive from the client a selection of at least one selectable legal statute category and a search criterion;
   retrieve at least one legal statute from the selected legal statute database based on the at least one selected legal statute category, the search criterion and the effective date; and
   transmit to the client the retrieved at least one legal statute.

* * * * *